United States Patent [19]
Bellanca et al.

[11] Patent Number: 5,011,172
[45] Date of Patent: Apr. 30, 1991

[54] LIGHTWEIGHT BICYCLE WITH IMPROVED FRONT AND REAR WHEEL FORK AND METHOD OF CONSTRUCTING SAME

[76] Inventors: August T. Bellanca; August T. Bellanca, Jr., both of Wilson Point Rd., Galena, Md. 21635

[21] Appl. No.: 302,948

[22] Filed: Jan. 30, 1989

[51] Int. Cl.$^5$ ............... B62K 19/02; B62K 19/16; B62K 19/30
[52] U.S. Cl. .................... 280/281.1; 264/258; 280/288.3
[58] Field of Search ............ 280/281.1, 288.1, 288.2, 280/288.3; 264/257, 258

[56] References Cited

U.S. PATENT DOCUMENTS

| | | | |
|---|---|---|---|
| 3,833,242 | 9/1974 | Thompson, Jr. | 280/281.1 |
| 4,828,781 | 5/1989 | Duplessis et al. | 264/257 X |

FOREIGN PATENT DOCUMENTS

| | | | |
|---|---|---|---|
| 979506 | 4/1951 | France | 280/281.1 |
| 124011 | 2/1949 | Sweden | 280/281.1 |

*Primary Examiner*—Mitchell J. Hill
*Attorney, Agent, or Firm*—Connolly & Hutz

[57] ABSTRACT

A lightweight bicycle frame having improved rear fork rigidity constructed by attaching the front section of a left and a right subassembly each having a "C" shaped cross-section and each being the mirror image of each other to which is attached to the rear section of the connected subassemblies to form the rear fork of the frame a third subassembly substantially in the form of an oval folded about its minor axis approximately 160 to 166 degrees which provides improved rigidity to said rear fork and a front fork similarly constructed from two "C" shaped subassemblies which are connected to each other at a tap section thereof to which is attached at a lower section thereof a third "U" shaped subassembly which provides further lightweightness to the bicycle assembled from said front fork.

9 Claims, 5 Drawing Sheets

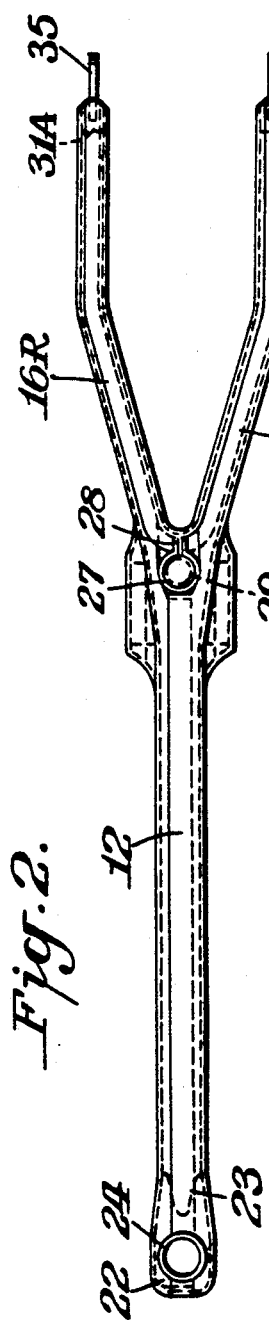
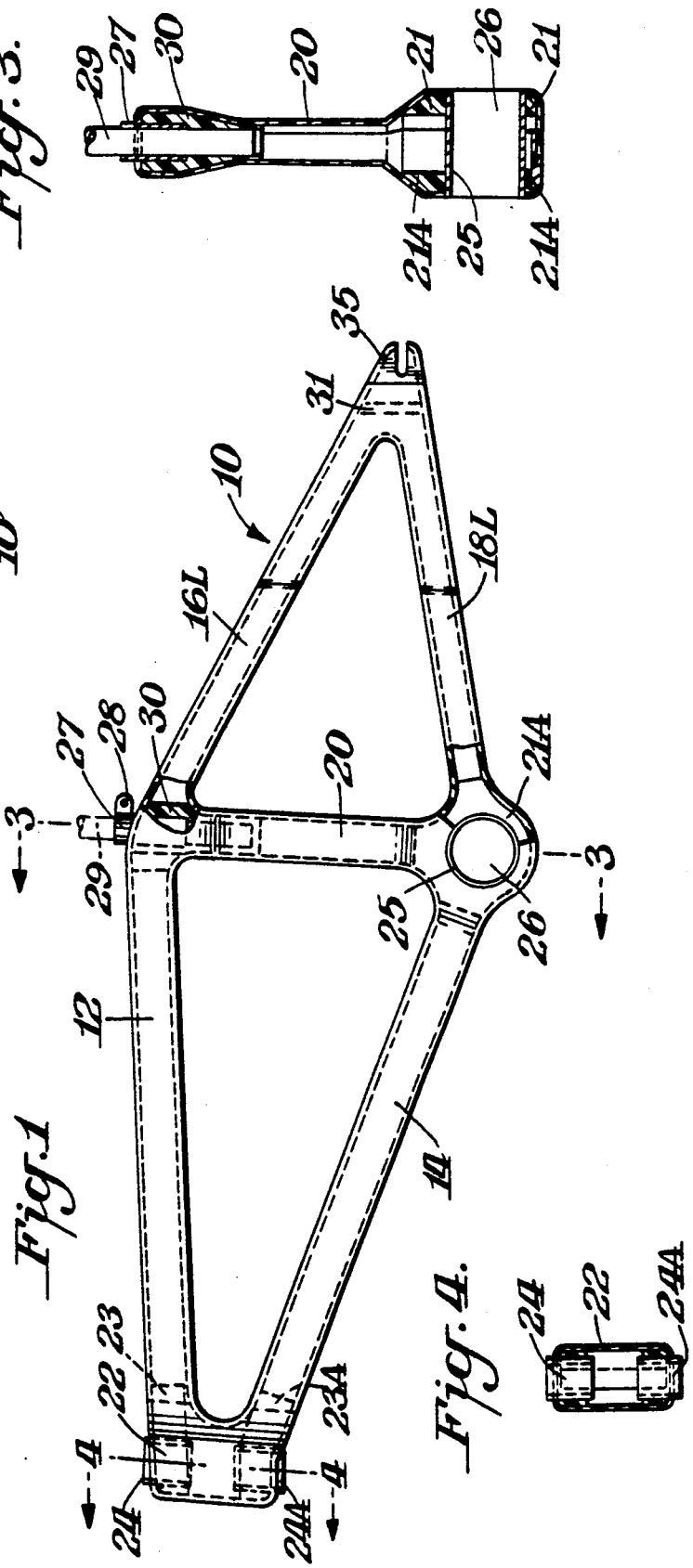

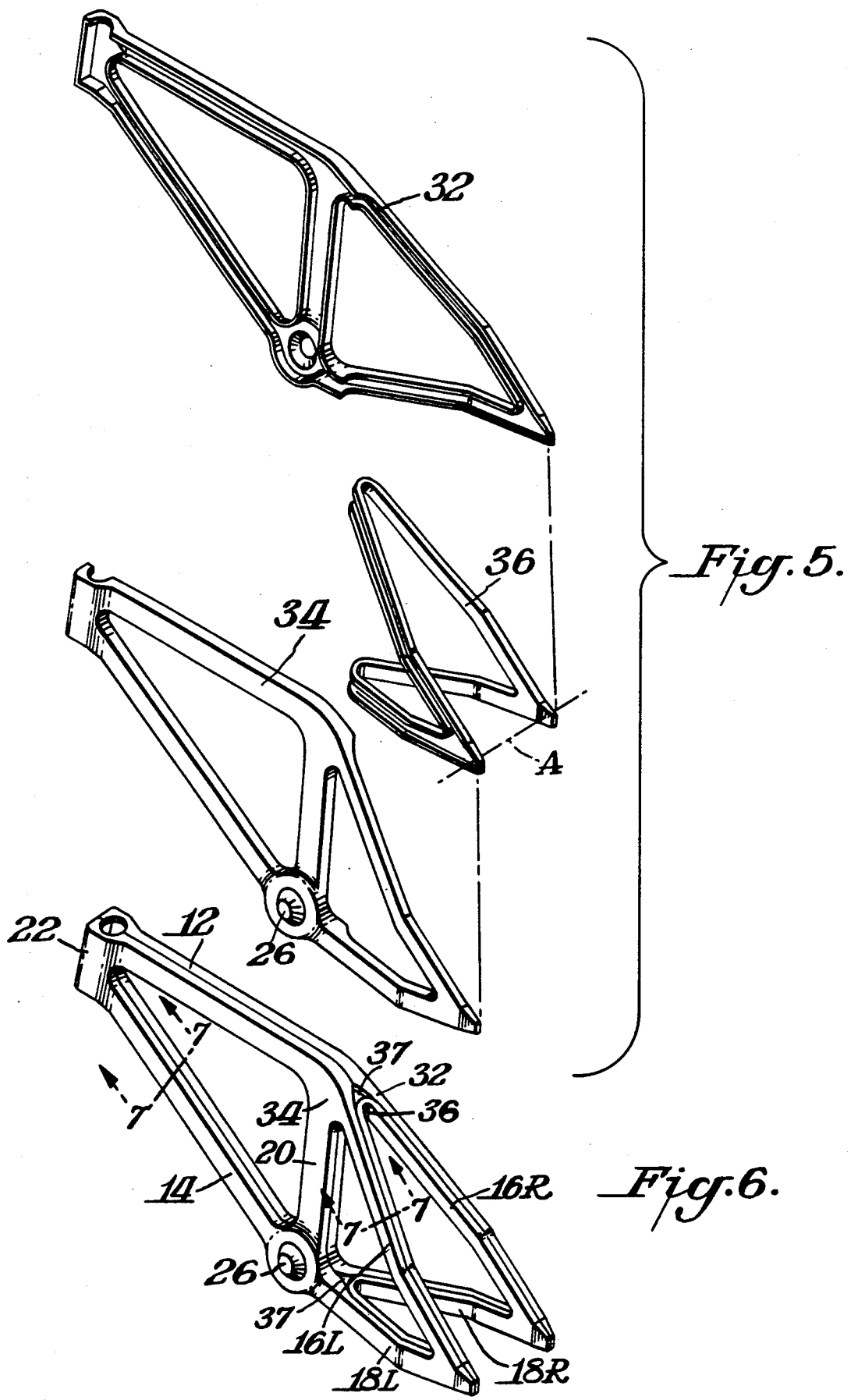

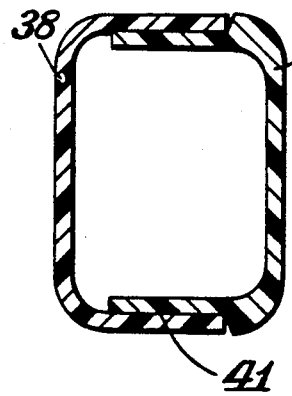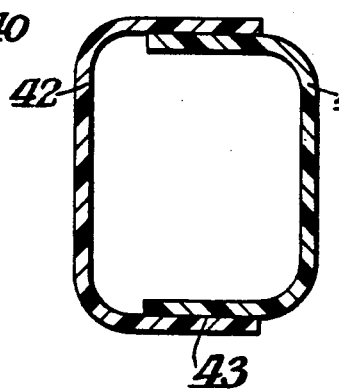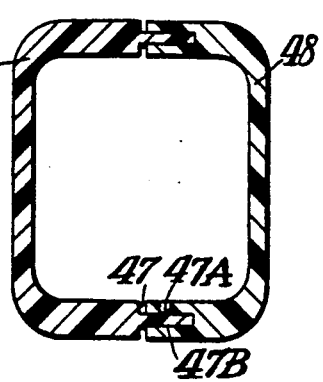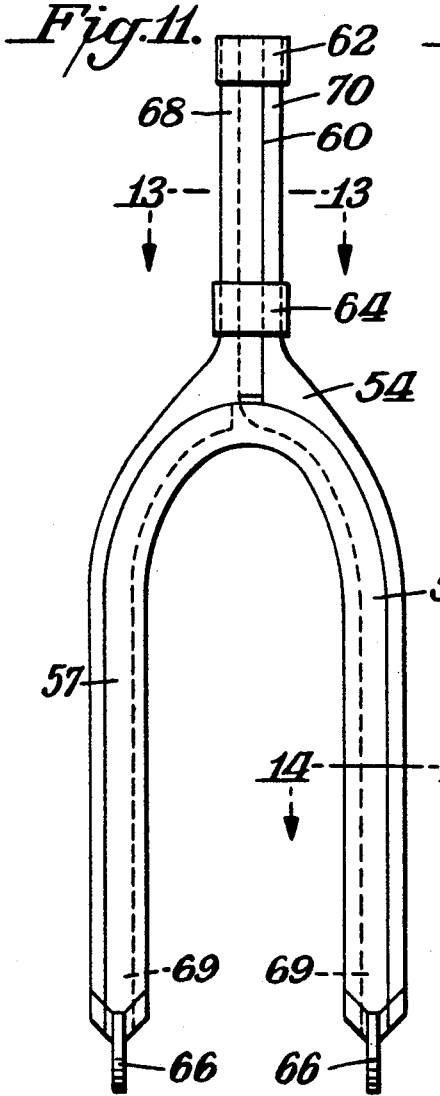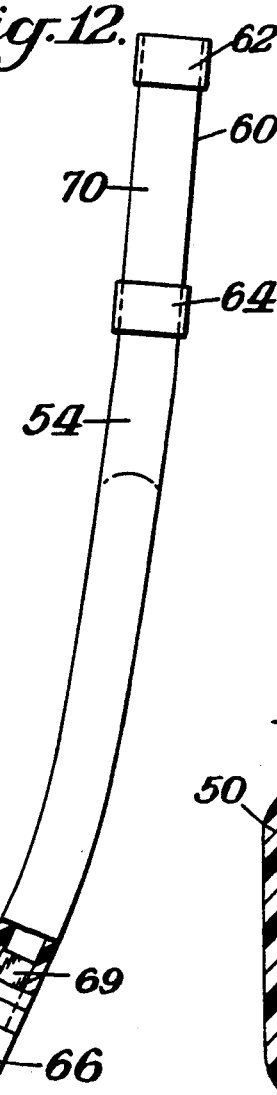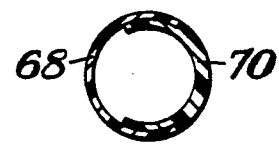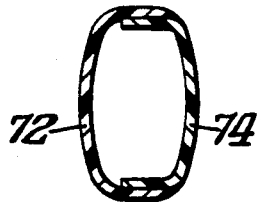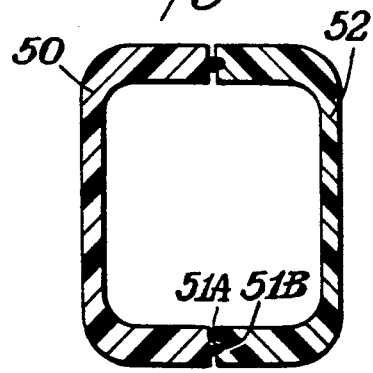

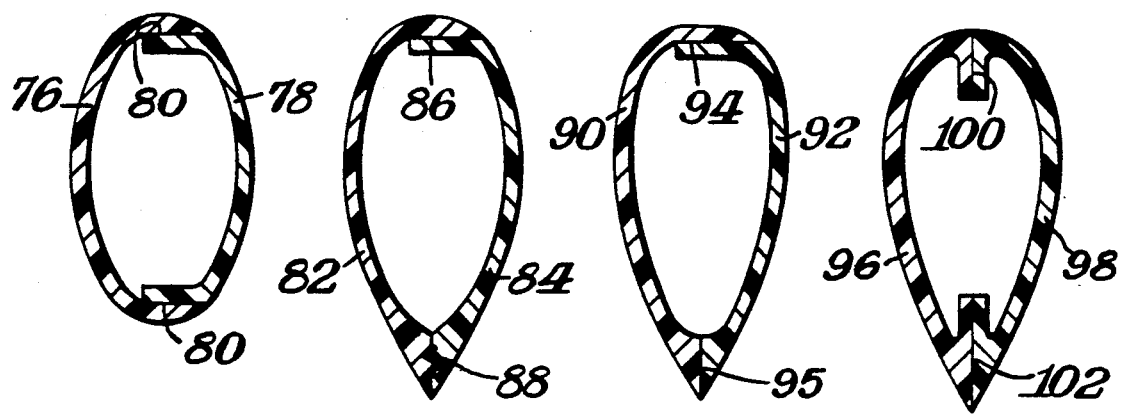

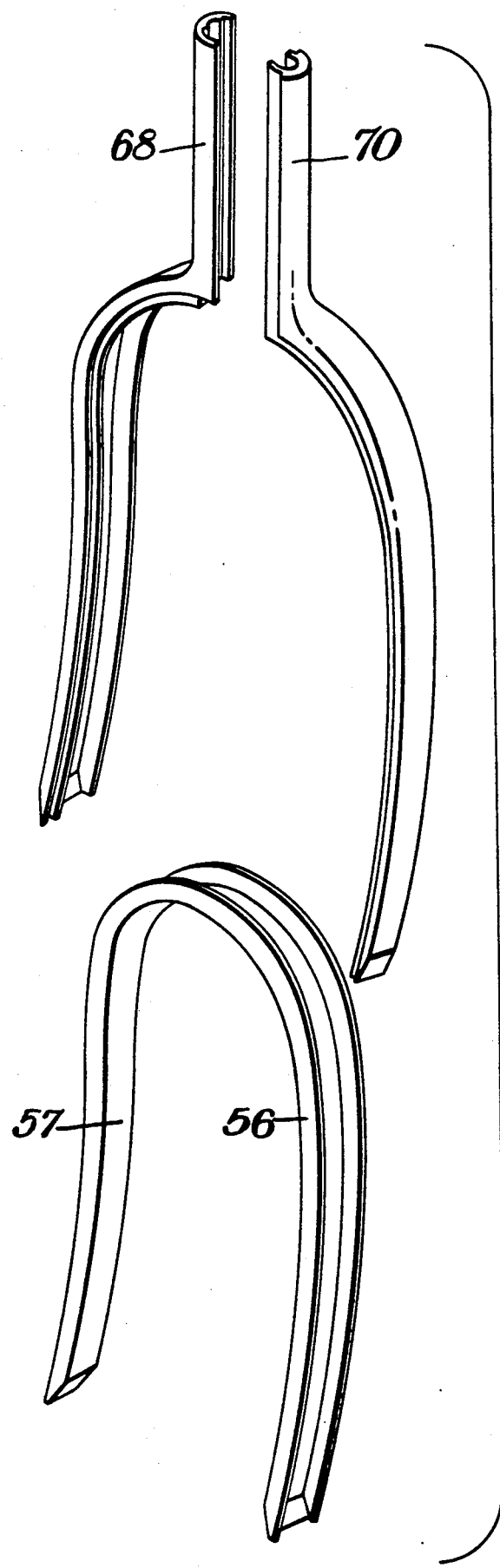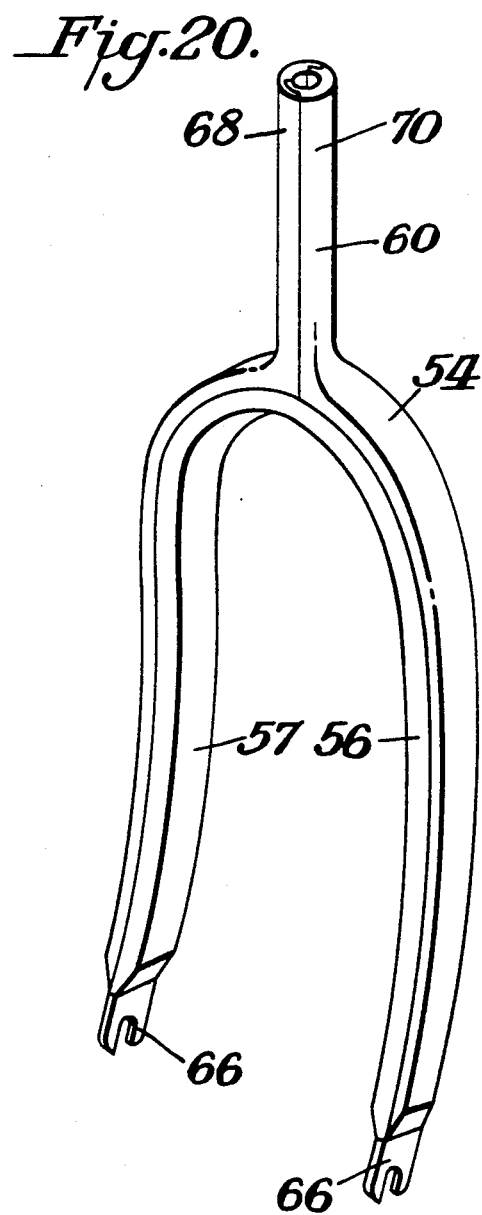
Fig.20.
Fig.19.

LIGHTWEIGHT BICYCLE WITH IMPROVED FRONT AND REAR WHEEL FORK AND METHOD OF CONSTRUCTING SAME

BACKGROUND AND BRIEF DESCRIPTION OF THE INVENTION

This invention relates to a novel bicycle frame and the method of constructing the bicycle frame.

It is highly desirable to produce a bicycle having a frame that is both rigid and lightweight. Rigidity prevents bending of the frame during cycling. It is desirable to eliminate since bending of the frame because it causes a loss of pedal energy. A lightweight bicycle is highly desirable especially in racing bicycles since less energy is required to propel a lightweight bicycle. The present invention provides a preferred frame and front fork for a bicycle having both low weight and front and rear fork rigidity. This invention is also directed to the method for constructing said bicycle frame and front fork.

This invention is directed to a lightweight rigid bicycle frame comprising left and right subassemblies which are the mirror image of each other; each subassembly has a "C" shaped cross-section; each subassembly has a forward end and a rear end; and the left subassembly is attached to the right subassembly at the forward ends thereof to form the frame having a front section and a rear section comprising:
 (a) a head tube;
 (b) a crank housing;
 (c) a rear fork;
 (d) a top hollow member having a front end and a rear end wherein said front end is attached to the head tube;
 (e) a down hollow member having a forward and a rear end wherein said forward end is attached to the head tube; and
 (f) a seat down hollow member having a top end and a bottom end wherein said top end is attached to the rear end of the top hollow member and the bottom end is attached to the crank housing; the rear section of the frame consisting of the rear end of said left and right subassemblies which are separated from each other to form a cavity to which is inserted and attached a rear subassembly having a "C" shaped cross-section and which is in the shape of an oval folded about its minor axis to form said rear fork of the frame comprising:
  (i) two seatstay hollow members each having a forward end and a rear end wherein the forward ends are attached to the top of the seat down hollow member; and
  (ii) two chainstay hollow members each having a forward end and a rear end wherein the forward ends are attached to the crank housing and the rear end of one of the chainstay hollow members is attached to the rear end of the other chainstay hollow member.

This invention is further directed to a lightweight front bicycle fork similarly formed from left and right subassemblies attached at the top ends to form a tubular section of the fork which fits into the head tube of the bicycle wherein the bottom portions of the left and right subassemblies form a cavity to which is attached a "U" shaped subassembly. The front fork of this invention is lightweight and rigid.

The above objects, advantages and features of the invention will be understood from the following drawings, in which:

FIG. 1 is a side-elevational view of a bicycle incorporating the invention.

FIG. 2 is a top-plan view of the bicycle shown in FIG. 1.

FIG. 3 is a cross-sectional view of the seat tube assembly taken along line 3—3 of FIG. 1.

FIG. 4 is a cross-sectional view of the head set assembly taken along line 4—4 of FIG. 1.

FIG. 5 is an exploded pictorial view of the elements of the bicycle frame.

FIG. 6 is a pictorial view of the assembled bicycle frame.

FIG. 7 is a cross-sectional view taken along line 7—7 of FIG. 6, of the frame components formed from identical hollow channel sections.

FIG. 8 is an alternate view of FIG. 7.

FIG. 9 is a further alternate view of FIG. 7.

FIG. 10 is a further alternate view of FIG. 7.

FIG. 11 is a front-elevational view of the bicycle front fork.

FIG. 12 is a side elevational view of the bicycle front fork.

FIG. 13 is a cross-sectional view taken along line 13—3 of FIG. 11.

FIG. 14 is a cross-sectional view taken along line 14—14 of FIG. 11.

FIG. 15 is an alternate view of FIG. 14.

FIG. 16 is a further alternate view of FIG. 14.

FIG. 17 is a further alternate view of FIG. 14.

FIG. 18 is a further alternate view of FIG. 14.

FIG. 19 is an exploded pictorial view of the front fork of the bicycle of this invention.

FIG. 20 is a pictorial view of the assembled front fork.

DESCRIPTION OF THE PREFERRED EMBODIMENTS

Referring to the drawings, FIG. 1 through FIG. 6 show the bicycle frame 10 of this invention, wherein a head tube 22, adapted to receive a front fork, is attached to a top hollow element 12 at the forward end thereof and a down hollow element is attached at the forward end thereof to the head tube 22, a down seat hollow element 20 is attached at its upper end to the rear end of the top hollow element 12, a crank housing 26 is attached to the lower ends of the down hollow element 14 and the seat hollow element 20, two seatstay hollow elements 16L and 16R are attached at their upper ends to the upper end of seat hollow element 20 and at their lower ends to two drop outs 35 adapted to receive the axle of a bicycle wheel and two chainstay hollow elements 18L and 18R attached at their forward ends to the crank housing 26 and at their rear ends to the two drop outs 35.

The head tube 22 is fitted with a top bearing 24 and a bottom bearing 24A. The bearings are held in place by two bearing hold inserts 23 and 23A. Inserted into the top of the seat hollow elements 20 is a seat tube support 27 adapted to receive a rod 29 supporting a seat (not shown). The seat tube support 27 has an axial slot bounded by two extensions 28 adapted to have a clamping element extending therethrough for clamping the rod 29. The crank housing 26 is fitted with a bearing 25. The crank housing is held in place by crank housing hold inserts 21 and 21A. The two drop outs 35 are held in place by drop out hold inserts 31 and 31A. FIG. 5 and FIG. 6 show the subassembly components used to construct the frame. In FIG. 5 and 6, the frame 10 consisting of a right subassembly 32 and a left subassembly 34, which are substantially identical mirror images of one another, attached to each other at the forward ends thereof, by glue or welding, depending upon the material of construction, to form the head tube 22, the down hollow member 14, the top hollow member 12 and the down seat hollow member 20. The rear end of the two side assemblies form a cavity. A third subassembly 36 in the shape of an oval which has been folded about its minor axis A approximately 160–166 degrees, and preferably 164 degrees, is similarly attached to the rear ends of the two connected subassemblies 32 and 34 in the cavity formed thereby to form the seatstay hollow elements 16L and 16R and the chainstay hollow elements 18L and 18R. The left and right sections of the rear fork formed from the left and right subassemblies with the third subassembly 36 inserted therebetween are separated sufficiently to permit a back wheel to be inserted into the rear fork.

The subassemblies have a "C" shaped cross-section and are adapted to overlap or interlock with each other to form a strong hollow shaped composite. FIGS. 7–10 and 15 through 18 show various modes of overlapping and interlocking of the subassemblies to form the hollow frame which can vary in cross-section. In FIG. 7, the subassemblies 32 and 34 are connected by a half lap overlapping joint 41 wherein the left frame member 38 overlaps the right frame member 32. In FIG. 8, the two subassemblies 32 and 34 are connected by a simple overlapping joint 43 where the left side subassembly 42 overlaps the right side subassembly 44. In FIG. 9, a tongue and groove joint 47 is formed wherein an extension of the left subassembly 46 extends into a tongue which fits into a groove formed in the ends of the right subassembly 48. In FIG. 10, a rib in groove joint 51 is formed when the edge of the left subassembly extends into a rib 51A which fits into a groove 51B in the right subassembly 52.

The subassemblies can be constructed of metal, thermoplastics or rigid fiber filled reinforced resin such as a polyester cured by a peroxide or by an epoxy resin cured by conventional epoxy resin curing systems. The fiber used to fill the resin is preferably carbon fiber or an aromatic polyamide such as Kelvilar (a trademark of) E.I. dupont de Nemours and Co, Inc., Wilmington, Del. for aramid fibers. The fiber also can be glass fiber. When metal is used, a mold of the subassembly is formed and the subassemblies stamped therefrom. The frame can be formed from molten metal or thermoplastic by injecting these materials in the molten form into a mold and allowing them to cool to harden. When a thermoplastic is used, the thermoplastic can be a polyamide or any other thermoplastic having good mechanical properties. The fiber filled reinforced resin frame is formed by forming a mold having the external shape of the subassembly. A first layer of resin is poured or laid into the mold and partially cured. A mixture of resin and fiber containing an appropriate curing agent is placed next to the partially cured resin to the desired thickness of the subassembly and then cured. For improved strength and rigidity the fiber can be placed in the mold in a manner where they are cross oriented to each other. Curing can be accelerated by applying heat to the mold containing the fiber resin mixture.

The mirror image shaped subassemblies and the rear subassembly are attached to each other by welding if the frame is composed of metal is used and by an adhesive such as epoxy resin adhesives when the frame is composed of metal, thermoplastic or fiber filled resin.

Additional rigidity and strength is obtained by filling the openings 37 shown in FIG. 6 at the top and bottom of the seat hollow member with an adhesive such as an epoxy resin.

FIG. 11, 12, 19 and 20 show the front wheel fork 54 which can be metal, thermoplastic or preferably composed of fiber filled resin similar to the frame. The front wheel fork 54 has an upper circular tube member 60 to which top bearing 62 and bottom bearing 64 are attached. The front fork is composed of a left leg subassembly 68 and a right leg subassembly 70. At the lower ends of each fork leg is attached a drop out 66 for attachment to the axle of the front wheel of the bicycle. The drop outs each have an extension 69 embedded in the body of the fork. A "U" shaped subassembly having a left leg 57 and a right leg 56 is inserted into the cavity formed by joining the subassemblies 68 and 70 at a top portion thereof. FIG. 14 through 18 show the cross-section of the front fork farme having an oval or aerodynamic shape to minimize air resistance composed of two subassemblies 72 and 74. Another embodiment having a preferred cross-section with reduced air resistance is shown in FIG. 15, where two subassemblies 76 and 78 are connected by half lap overlapping joints 80. In FIG. 16, an aerodynamically superior cross-section of the front fork is shown composed of two subassemblies 82 and 84 connected by a half lap overlapping joint 86 and a "saw tooth" joint 88. In FIG. 17, another front fork cross-section having a lower wind-resistance is shown to be composed of two subassemblies 90 and 92 connected by half lap overlapping joints 94 and 95. In FIG. 18, still another embodiment of the cross-section of the front fork is shown with preferred lower wind resistance composed of two subassemblies 96 and 98 connected by flat joints 100 and 102.

The front fork can be constructed of a tubular material or preferably using two side assemblies which are the mirror image of each other as shown in FIG. 15 with a third "U" shape assembly which are welded or glued to each other as described herein for the frame.

It is obvious that cables for a rear clamping brake and for a derailleur multi-speed system can be inserted into the hollow frame during construction. The openings for the ends of the cables can be conveniently located as required on the frame.

The invention is not limited to the embodiments which are shown and which have been described in detail since they can be modified in various ways without departure from the scope of the invention. For example, the frame and fork subassemblies can be constructed as described above from solid elements instead of the hollow elements having a "C" shaped cross-section described above or partially from solid elements and hollow elements.

We claim:

1. a lightweight, rigid bicycle frame comprising left and right subassemblies which; (a) are the mirror image of each other; each subassembly has a "C" shaped cross-section; each subassembly has a forward and rear end and said subassemblies are attached to each other at the forward ends to form a front portion of the frame comprising:

(a) a head tube;

(b) a crank housing;
(c) a rear fork;
(d) a top hollow member having a front end and a rear end wherein said front end is attached to the head tube;
(e) a down hollow member having a forward and a rear end wherein said forward end is attached to the head tube;
(f) a down seat hollow member having a top end and a bottom end wherein said top end is attached to the rear end of the top hollow member and the bottom end is attached to the crank housing; said rear ends of said left and right subassemblies being separated from each other to form a cavity to which is inserted and attached;
(g) a rear "C" shaped subassembly in the shape of an oval folded about its minor axis and mounted in said cavity and attached to said rear ends of said left and right subassemblies with the C-shape of said rear subassembly complementing the C-shape of the respective left and right subassemblies to form said rear fork; and
(h) said rear fork of the frame comprising:
  (i) two seatstay hollow members each having a forward end and a rear end wherein the forward ends are attached to the top of the down seat hollow member;
  (ii) two chainstay hollow members each having a forward end and a rear end wherein the forward end is attached to the crank housing and the rear end of each of the chainstay hollow members is attached to the rear end of a respective seatstay hollow member; and
  (iii) the rear "C" shaped subassembly is in the shape of an oval fold 160 to 166 degrees about its minor axis.

2. a lightweight, rigid cycle frame comprising left and right subassemblies which: (a) are the mirror image of each other; each subassembly having a "C" shaped cross-section; each subassembly having a forward end and a rear end and said subassemblies being attached to each other at the forward ends to form a front portion of the frame comprising:
(a) a head tube;
(b) a crank housing;
(c) a rear fork;
(d) a top hollow member having a front end and a rear end wherein said front end is attached to said head tube;
(e) a down hollow member having a forward and a rear end wherein said forward ends are attached to said head tube; and
(f) seat mounting means at the juncture of said top hollow member and said rear fork;
(g) said rear ends of said left and right subassemblies being separated from each other to form a cavity, a rear "c" shaped subassembly being inserted in said cavity and attached to said left and right subassemblies, said rear "C" shaped subassembly in the shape of an oval folded about its minor axis to form said rear fork;
(h) said rear fork comprising:
  (i) two seatstay hollow members each having a forward end and a rear end wherein the forward ends are attached to said top hollow members; and
  (ii) two chainstay hollow members each having a forward end and a rear end wherein the forward end is attached to said crank housing and the rear end of each of the chainstay hollow members is attached to the rear end of a respective seatstay hollow member; and
  (iii) said left and right subassemblies and said rear subassembly being separate and distinct structural members attached together by securing means.

3. The frame of claim 2 wherein said cycle is a bicycle, said seat mounting means comprises a down seat hollow member extending between said top hollow member of each of said left and right subassemblies and said crank housing of each of said left and right subassemblies; and said downseat hollow member being formed by portions of said left and right subassemblies being attached together.

4. The frame of claim 2 wherein said subassemblies are made of metal attached together by welding to comprise said securing means.

5. The frame of claim 2 wherein said subassemblies are made of a plastic material and are attached together by an adhesive to comprise said securing means.

6. The frame of claim 5 wherein said subassemblies are made of a thermoplastic material.

7. The frame of claim 5 wherein said subassemblies are made of a fiber reinforced resin material.

8. The frame of claim 2 wherein said subassemblies are attached together in an overlapping manner.

9. The frame of claim 2 wherein said subassemblies are attached together in an interlocking manner.

* * * * *